United States Patent
Hirato

[11] Patent Number: 5,975,231
[45] Date of Patent: Nov. 2, 1999

[54] APPARATUS FOR AIDING ESCAPE OF PASSENGER

[75] Inventor: Sakiko Hirato, Yokohama, Japan

[73] Assignee: Nissan Motor Co., Ltd., Yokohama, Japan

[21] Appl. No.: 08/696,597

[22] Filed: Aug. 14, 1996

[30] Foreign Application Priority Data

Sep. 26, 1995 [JP] Japan ................................ 7-247532

[51] Int. Cl.$^6$ ................................................ B60K 28/10
[52] U.S. Cl. ........................ 180/274; 180/282; 180/286
[58] Field of Search .................................. 180/268, 274, 180/281, 282, 286; 280/777, 735; 701/45; 296/68.1

[56] References Cited

U.S. PATENT DOCUMENTS

| 4,003,047 | 1/1977 | Johnson ................................ 180/286 |
| 4,243,248 | 1/1981 | Scholz et al. ........................ 280/735 |
| 4,620,721 | 11/1986 | Scholz et al. ........................ 280/735 |
| 4,781,267 | 11/1988 | Waineo et al. ...................... 180/268 |
| 4,984,651 | 1/1991 | Grosch et al. ...................... 280/735 |
| 5,123,498 | 6/1992 | Alcidi et al. ........................ 180/268 |
| 5,207,451 | 5/1993 | Furuse et al. ...................... 280/775 |
| 5,547,208 | 8/1996 | Chappell et al. .................... 180/281 |
| 5,574,315 | 11/1996 | Weber ................................ 307/10.1 |

FOREIGN PATENT DOCUMENTS 5-139246  6/1993  Japan ................................ 180/268

Primary Examiner—Christopher P. Ellis
Assistant Examiner—David R. Dunn
Attorney, Agent, or Firm—Foley & Lardner

[57] ABSTRACT

An apparatus for aiding escape of passengers having an impact detection unit for detecting an impact which is generated when a vehicle has come into collision, vehicle state detection units for detecting a state of the vehicle realized after the vehicle has come into collision, and operation control units for controlling operations of units mounted on the vehicle in accordance with the impact generated when the vehicle has come into collision and detected by the impact detection unit and the state of the vehicle realized after the vehicle has come into collision and detected by the vehicle state detection units.

20 Claims, 2 Drawing Sheets

APPARATUS FOR AIDING ESCAPE OF PASSENGER

BACKGROUND OF THE INVENTION

1. Field of the Invention

The present invention relates to an apparatus for aiding escape of passengers to the outside of a vehicle if the vehicle comes into collision.

2. Description of the Related Art

An apparatus has been known (refer to Japanese Patent Laid-Open No. 5-139246) which detects stop of a vehicle and interruption of an engine, when the vehicle has come into collision, so as to unlock doors and release seat belts.

Another apparatus has been known (refer to Japanese Utility Model Laid-Open No. 60-51267) which unlocks a child safety lock when the vehicle has come into collision. Note that the child safety lock is an apparatus for permitting the door to be opened only from the outside of the vehicle in order to prevent an accident that the door is unintentionally opened by a child.

Recently, vehicles are equipped with a power window, a sun roof, a trunk opener and an automatic driving position system in order to improve safety, enhance operation facility and realize comfortableness. The power window is an apparatus for moving the door windows by actuators so that the windows are opened/closed in accordance with the operations of corresponding switches. The sun roof is an apparatus for causing an actuator to move a sun roof lid disposed in the ceiling of the vehicle to open/close the sun roof lid in accordance with the operations of corresponding switches. The trunk opener is an apparatus for causing an actuator to move the trunk lid to open/close the trunk lid in accordance with the operations of corresponding switches. The automatic driving position system is an apparatus for moving the driver's seat rearwards and tilting up and contracting the steering wheel when the driver on the driver's seat gets off the vehicle to facilitate getting in and out of the vehicle. Moreover, after the driver gets in the vehicle, the automatic driving position system restores the seat and the steering wheel to the previously stored positions.

The vehicle equipped with the foregoing units are required to have a total system including a conventional unit for unlocking the door locks, the child safety lock and releasing the seat belts and an apparatus for aiding escape of the passengers when the vehicle has come into collision.

SUMMARY OF THE INVENTION

An object of the present invention is to provide an apparatus for aiding escape of passengers to the outside of a vehicle when the vehicle has come into collision.

In order to achieve the foregoing object, according to one aspect of the present invention, there is provided an apparatus for aiding escape of passengers, comprising: impact detection means for detecting an impact which is generated when a vehicle has come into collision; vehicle state detection means for detecting a state of the vehicle realized after the vehicle has come into collision; and operation control means for controlling operations of units mounted on the vehicle in accordance with the impact generated when the vehicle has come into collision and detected by said impact detection means and the state of the vehicle realized after the vehicle has come into collision and detected by said vehicle state detection means.

The impact detection means of the apparatus for aiding escape of passengers according to the present invention may have a structure such that the impact detection means detects deceleration of the vehicle as the impact which is generated when the vehicle has come into collision.

The deceleration of the vehicle is detected as the impact which is generated when the vehicle has come into collision and the state of the vehicle realized after the vehicle has come into collision is detected to control the operations of the units mounted on the vehicle.

The apparatus for aiding escape of passengers according to the present invention may, have a structure such that the impact detection means includes first state detection means for detecting a state where doors of the vehicle are locked, second state detection means for detecting a state where doors of the vehicle are opened and third state detection means for detecting a state where a foot brake is applied so that the state of the vehicle realized after the vehicle has come into collision is detected by the first to third state detection means.

The impact generated by the vehicle collision is detected and, the state of the vehicle after the vehicle has collision i.e., the state where the doors of the vehicle are locked, the state where the doors of the vehicle are opened and the state where the foot brake is applied) are detected. In accordance with the detected impact which is generated when the vehicle has come into collision and the state of the vehicle realized after the vehicle has come into collision, the operations of the units mounted on the vehicle are controlled.

The apparatus for aiding escape of passengers according to the present invention may, have a structure such that the units mounted on the vehicle include a power window, a sun roof, a child safety lock, a seat belt, an automatic driving position system and a trunk opener.

The impact, generated when the vehicle has come into collision, and the state of the vehicle realized after the vehicle has come into collision are detected. In accordance with the detected results, operations of the units mounted on the vehicle, including the power window, the sun roof, the child safety lock, the seat belt, the automatic driving position system and the trunk opener, are controlled.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
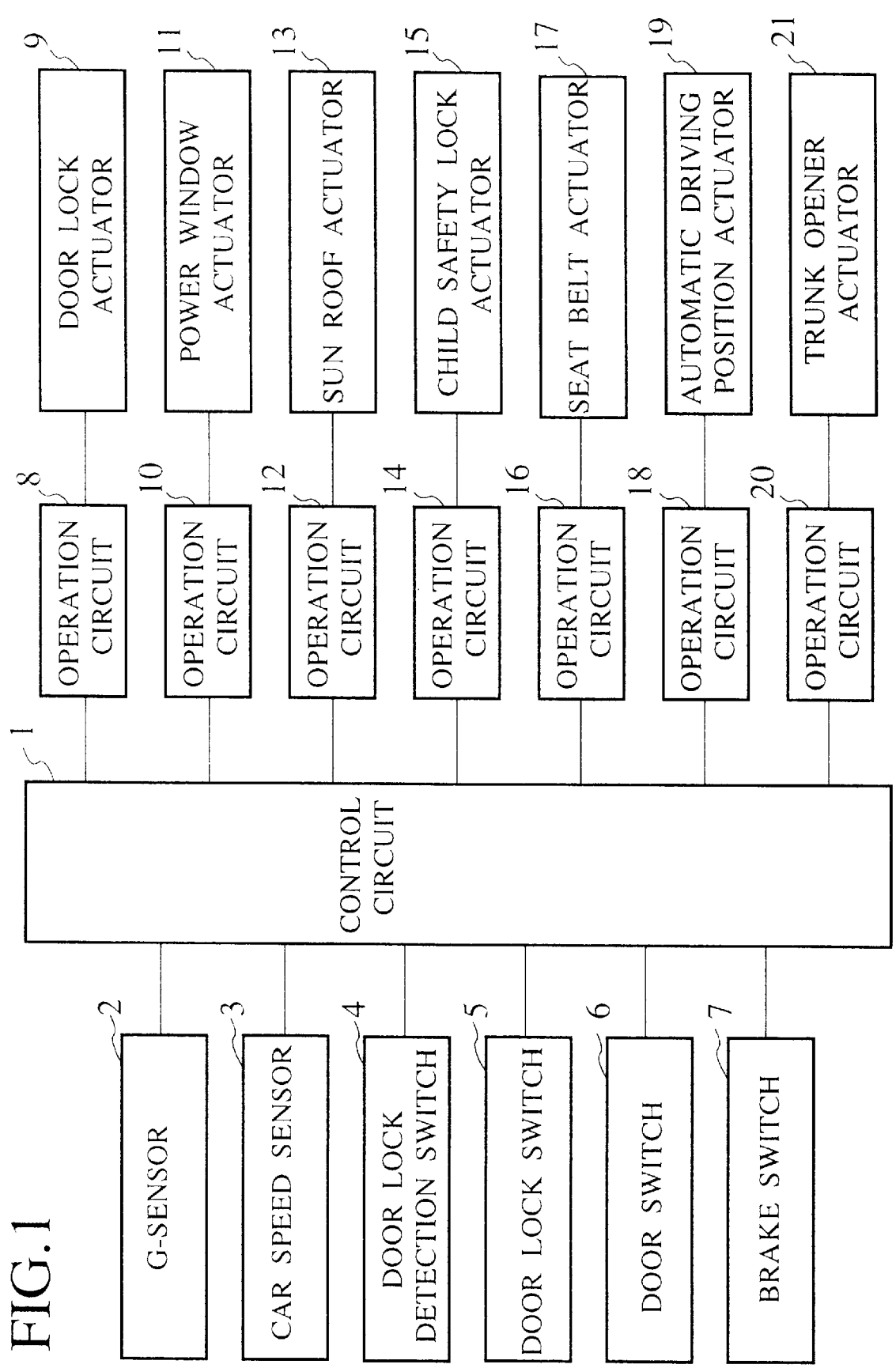
FIG. 1 is a block diagram showing the structure of the apparatus for aiding escape of passengers according to an embodiment of the present invention.

An embodiment of the present invention will be described with reference to the accompanying drawings hereinafter.

A control circuit 1 is composed of a microcomputer and peripheral elements of the microcomputer to detect an impact which is generated when the vehicle has come into collision and a state of the vehicle realized after the vehicle has come into collision in accordance with various sensors and switches so as to operate and control various units mounted on the vehicle to aid passengers to escape to the outside of the vehicle.

The various sensors and switches are connected to the control circuit 1. A G-sensor 2 is a sensor for detecting deceleration G of the vehicle. In this embodiment, the deceleration G generated when the collision has taken place is considered to be the impact when the collision has taken place. A car speed sensor 3 is a sensor for detecting the car speed. A door lock detection switch 4 is a detection switch which is switched on when a door of the vehicle is unlocked and switched off when the door is locked. A door lock switch 5 is an operation switch for locking the door of the vehicle. A door switch 6 is a detection switch which is switched on when the door of the vehicle has been opened and switched off when the door has been closed. A brake switch 7 is a detection switch which is switched on when a foot brake has been applied and switched off when the foot brake has been released. The switches 4 to 6 are disposed in each door of the vehicle.

Moreover, operation circuits for operating the various units mounted on the vehicle are connected to the control circuit 1. An operation circuit 8 operates a door lock actuator 9 to lock/unlock the door. An operation circuit 10 operates a power window actuator 11 to open/close the door window. The operation circuits 8 and 10, the door lock actuator 9 and the power window actuator 11 are disposed in each door. An operation circuit 12 operates a sun roof actuator 13 to open/close a sun roof lid. An operation circuit 14 operates a child safety lock actuator 15 to unlock a child safety lock. The operation circuit 14 and the child safety lock actuator 15 are disposed in each door of the vehicle except the door adjacent to the driver's seat. An operation circuit 16 operates a seat belt actuator 17 to release a seat belt. The operation circuits 16 and 17 are disposed in each seat of the vehicle. An operation circuit 18 operates an automatic driving position system actuator 19 to move the driver's seat rearward, tilt up the steering wheel and contract the steering wheel. An operation circuit 20 operates a trunk opener actuator 21 to open a trunk lid.

A vehicle, which has come into collision, is deformed variously according to the magnitude of the impact and the state of the vehicle realized after the vehicle has come into collision. Therefore, the state where the passenger is confined in the vehicle varies considerably. In this embodiment, the operations of the various units mounted on the vehicle are controlled in accordance with the magnitude of the impact generated when the vehicle has come into collision and the state of the vehicle realized after the vehicle has come into collision so as to aid passengers to escape to the outside of the vehicle.

(1) Initially, whether the units 9, 11, 13, 15, 17, 19 and 21 are operated is determined in accordance with the impact generated when the vehicle has come into collision, that is, the magnitude of the deceleration G when the vehicle has come into collision.

If the deceleration G is larger than predetermined value G1, the power window, the sun roof and the trunk are opened, the driver's seat is moved rearwards, and the steering wheel is tilted up and contracted. If the deceleration G is not larger than the predetermined value G1, the child safety lock is unlocked and the seat belt is released.

(2) Moreover, whether the units 9, 11, 13, 15, 17, 19 and 21 are operated is determined in accordance with the state of the vehicle realized after the vehicle has come into collision.

If the door has been unlocked, the child safety lock is unlocked to enable a child or the like to be rescued from outside of the vehicle after the door is opened. If the door has been unlocked and the stoppage of the vehicle has been confirmed, the seat belt is immediately released to enable the passenger to escape to the outside of the vehicle. If the door cannot be unlocked after the vehicle has come into collision, stopping of the vehicle is confirmed. Then, the power window, the sun roof and the trunk are opened to keep an escape port. In the case where the vehicle has been stopped as well as the door has been opened and the foot brake has not been applied, the driver's seat is moved rearwards and the steering wheel is tilted up and contracted to facilitate the escape of the driver on the driver's seat.

Figure 2:
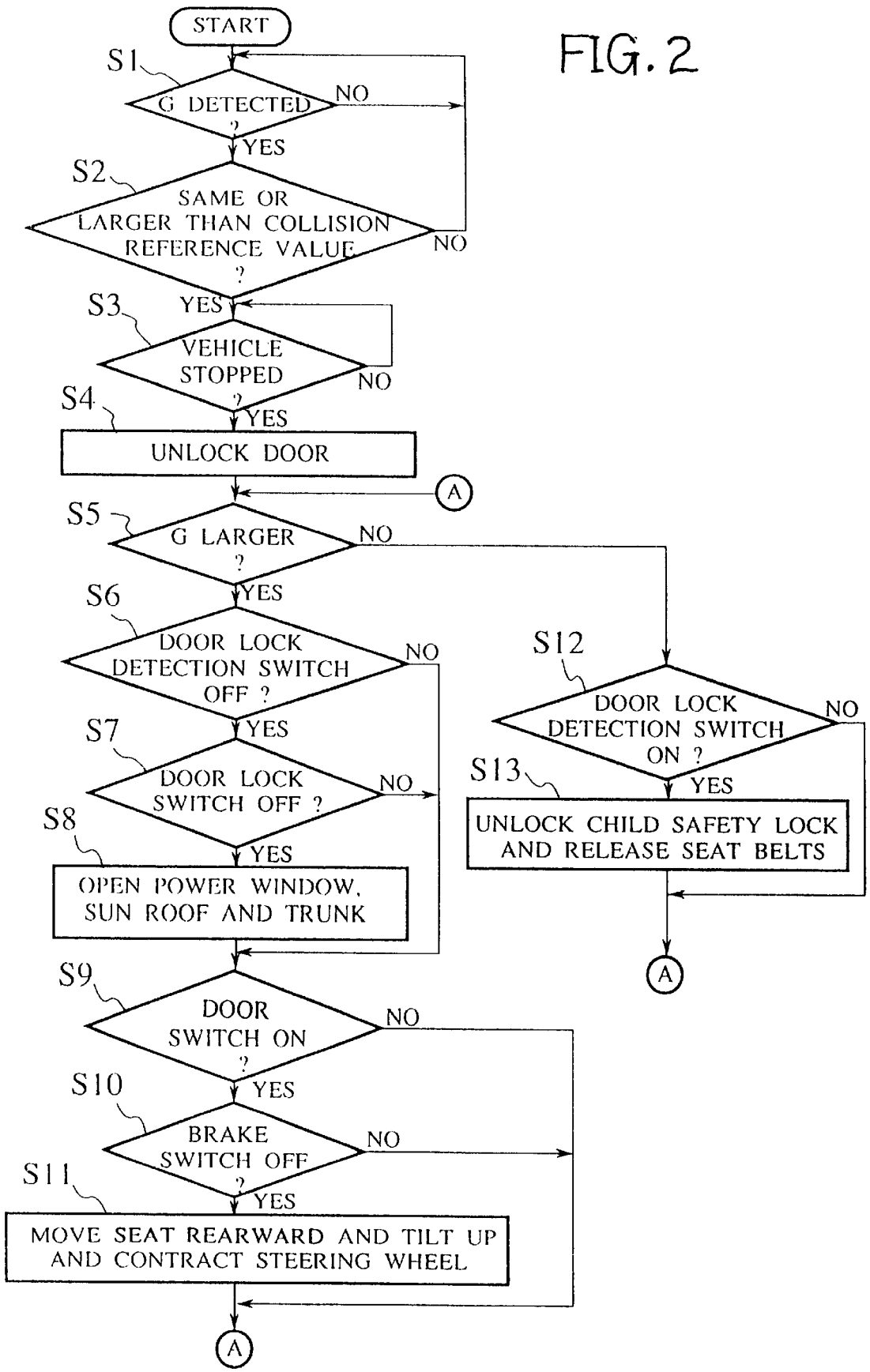
FIG. 2 is a flow chart of a program for controlling the operations of units mounted on the vehicle when the vehicle has come into collision.

FIG. 2 is a flow chart showing a program for controlling the operations of the units mounted on the vehicle when the vehicle has come into collision. The operation of this embodiment will now be described with reference to the flow chart.

In step S1 whether the deceleration G has been detected by the G-sensor 2 is determined. If the deceleration G has been detected, the operation proceeds to step S2. In step S2 whether the detected deceleration G is the same or larger than a predetermined collision reference value is determined. If a determination has been performed that a collision has taken place, the operation proceeds to step S3. If a negative determination has been performed, the operation returns to step S1. In step S3 whether the car speed is substantially zero, that is, whether the vehicle is in a stop state is determined by the car speed sensor 3. If the vehicle has been stopped, the operation proceeds to step S4 so that the operation circuit 8 is controlled to operate the door lock actuator 9. As a result, the door is unlocked.

In step S5 whether the detected deceleration G is larger than the predetermined value G1 is determined. If the deceleration G is larger than the predetermined value G1, the operation proceeds to step S6. If the deceleration G is not larger than the predetermined value G1, the operation proceeds to step S12. If the deceleration G is equal to or greater than G1, whether the door lock detection switch 4 has been turned off, that is, whether the door has been locked is determined in step S6. If the door has been locked, whether the door lock switch 5 has been switched off, that is, whether the door locking operation is being performed is determined in step S7. If the door has been locked and no door locking operation has been performed, a determination is performed that the operation of unlocking the door has been unsuccessful. Thus, the operation proceeds to step S8 so that escape ports except the door are kept by controlling the operation circuits 10, 12 and 20 to cause the actuators 11, 13 and 21 to open the window, the sun roof and the trunk. In a case where the door has been unlocked or in a case where the operation of locking the door has not been performed though the door has been locked, the window, the sun roof and the trunk are not opened.

In step S9 whether the door has been opened is determined in accordance with the door switch 6. If the door has been opened, the operation proceeds to step S10. In step S10 whether the foot brake has been applied is determined in accordance with the brake switch 7. If the foot brake has not been applied, the operation proceeds to step S11. If the door has been opened and the foot brake has not been applied, the operation circuit 18 is controlled in step S11. Thus, the automatic driving position system actuator 19 is operated to rearwards move the driver's seat rearward and to tilt up and contract the steering wheel. As a result, the driver on the driver's seat is enabled to easily escape to the outside of the vehicle. If the door has not been opened or if the foot brake has been applied, the driver's seat and the steering wheel are not moved.

If the detected deceleration G is smaller than the predetermined value G1, whether the door has been unlocked is determined in accordance with the door lock detection switch 4 in step S12. If the door has been unlocked, the operation proceeds to step S13 so that the operation circuits 14 and 16 are controlled to cause the actuators 15 and 17 to unlock the child safety lock and release the seat belt. If the door has not been unlocked, the child safety lock is not unlocked and the seat belt is not released.

In this embodiment, the G-sensor 2 constitutes an impact detection means, state detection means and operation control means. In this embodiment, the door lock detection switch 4 constitutes a first state detection means, the door switch 6 constitutes a second state detection means and the brake switch 7 constitutes a third state detection means. The operation control means includes the control circuit 1 and the operation circuits 8, 10, 12, 14, 16, 18 and 20.

Although this embodiment has the structure such that the impact generated when the vehicle has come into collision is determined in accordance with the deceleration of the vehicle, the method of determining the impact generated when the vehicle has come into collision is not limited to this.

Although this embodiment has the structure such that the state of the vehicle realized after the vehicle has come into collision is determined in accordance with the state where the doors of the vehicle are locked, the state where the doors of the vehicle are opened and the state where the foot brake is applied, the method of determining the state of the vehicle realized after the vehicle has come into collision is not limited to this.

Moreover, the units mounted on the vehicle are not limited to the foregoing units.

As described above, according to the present invention, the impact generated when the vehicle has come into collision and the state of the vehicle realized after the vehicle has come into collision are detected; and the operations of the units mounted on the vehicle, such as the power window, the sun roof, the child safety lock, the seat belt, the automatic driving position system and the trunk opener are controlled in accordance with the results of the detection. The impact generated when the vehicle has come into collision may be determined in accordance with the deceleration of the vehicle when the vehicle has come into collision. The state of the vehicle realized after the vehicle has come into collision may be determined in accordance with the state where the doors of the vehicle have been locked, the state where the doors of the vehicle have been opened and the state where the foot brake has been applied. As a result, the passenger is enabled to easily escape to the outside of the vehicle when the vehicle has come into collision so that safety is improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An apparatus for aiding escape of passengers comprising:
    an impact detection unit configured to detect a signal for determining the occurrence of an impact which is generated when a vehicle has come into collision;
    a comparison unit configured to compare the detected signal with first and second thresholds, the second threshold being larger than the first threshold;
    a first operation control unit configured to control operation of a first unit mounted on the vehicle in accordance with the comparison of the detected signal and the first threshold, wherein the first unit is a locking/unlocking unit of the vehicle; and
    a second operation control unit configured to control operation of at least one second unit mounted on the vehicle in accordance with the comparison of the detected signal and the second threshold, wherein the at least one second unit allows for escape of the passengers from the vehicle.

2. An apparatus for aiding escape of passengers according to claim 1, wherein said impact detection unit detects deceleration of the vehicle as the impact which is generated when the vehicle has come into collision.

3. An apparatus for aiding escape of passengers comprising:
    an impact detection unit configured to detect an impact which is generated when a vehicle has come into collision;
    a vehicle state detection unit configured to detect a state of the vehicle realized after the vehicle has come into collision; and
    an operation control means unit configured to control operations of units mounted on the vehicle in accordance with the impact generated when the vehicle has come into collision and detected by said impact detection unit and the state of the vehicle realized after the vehicle has come into collision and detected by said vehicle state detection unit,
    wherein said vehicle state detection unit includes a first state detection unit configured to detect a state where doors of the vehicle are locked, a second state detection unit configured to detect a state where doors of the vehicle are opened and a third state detection unit configured to detect a state where a foot brake is applied so that the state of the vehicle realized after the vehicle has come into collision is detected by said first to third state detection units.

4. An apparatus for aiding escape of passengers according to claim 1, wherein said second units mounted on the vehicle include a power window, a sun roof, a child safety lock, a seat belt, an automatic driving position system and a trunk opener.

5. An apparatus for aiding escape of passengers comprising:
    an impact detection unit configured to detect a signal for determining the occurrence of an impact which is generated when a vehicle has come into collision;
    a comparison unit configured to compare the detected signal with first and second thresholds, the second threshold being larger than the first threshold;
    a first operation control unit configured to control operation of a first unit mounted on a vehicle in accordance with the comparison of the detected signal and the first threshold; and
    a second operation control unit configured to control operation of at least one second unit mounted on the vehicle in accordance with the comparison of the detected signal and the second threshold,
    wherein said at least one second operation control unit operates a seat belt actuator to release a seat belt after a determination is made that an operation of unlocking doors has been successful.

6. An apparatus for aiding escape of passengers according to claim 1, wherein said at least one second unit includes an opener for an alternate escape, wherein said second operation control unit opens the opener when a determination is made that the detected signal is greater than the second threshold.

7. An apparatus for aiding escape of passengers according to claim 6, wherein said opener includes a sunroof opener.

8. An apparatus for aiding escape of passengers according to claim 6, wherein said opener includes a power window opener.

9. An apparatus for aiding escape of passengers according to claim 6, wherein said opener includes a trunk opener.

10. An apparatus for aiding escape of passengers according to claim 6, wherein said second operation control unit operates a passenger access device when a determination is made that the detected signal is less than the second threshold.

11. An apparatus for aiding escape of passengers according to claim 10, wherein said passenger access device includes a child safety lock, and wherein said at least one second operation control means unlocks said child safety lock.

12. An apparatus for aiding escape of passengers according to claim 10, wherein said passenger access device includes a safety belt release, and wherein said at least one second operation control means releases said safety belt release.

13. An apparatus for aiding escape of passengers comprising:
- an impact detection unit configured to detect an impact which is generated when a vehicle has come into collision;
- a first operation control unit configured to control a first operation by a first unit mounted on the vehicle in accordance with said impact detected by said impact detection unit;
- a vehicle state detection unit configured to detect a result of the first operation; and
- a second operation control unit configured to control operation of at least one second unit mounted on the vehicle in accordance with said result of the first operation detected by said vehicle state detection unit, wherein said first unit includes a power door lock system, wherein said first operation control unit performs an unlock operation, and wherein said vehicle state detection unit detects a result of the unlock operation.

14. An apparatus for aiding escape of passengers according to claim 13, wherein said at least one second unit includes an opener for an alternate escape, wherein said second operation control unit opens the opener when a determination is made that an operation of unlocking doors has been unsuccessful.

15. An apparatus for aiding escape of passengers according to claim 14, wherein said opener includes a sunroof opener.

16. An apparatus for aiding escape of passengers according to claim 14, wherein said opener includes a power window opener.

17. An apparatus for aiding escape of passengers according to claim 14, wherein said opener includes a trunk opener.

18. An apparatus for aiding escape of passengers according to claim 13, wherein said at least one second operation control unit operates a passenger access device when a determination is made that an operation of unlocking doors has been successful.

19. An apparatus for aiding escape of passengers according to claim 18, wherein said passenger access device includes a child safety lock, and wherein said at least one second operation control unit unlocks said child safety lock.

20. An apparatus for aiding escape of passengers according to claim 18, wherein said passenger access device includes a safety belt release, and wherein said at least one second operation control unit releases said safety belt release.

* * * * *